United States Patent Office 3,448,160
Patented June 3, 1969

3,448,160
METHOD OF SEPARATING LIQUID POLYMERS OF LOW ASH CONTENT FROM ZIEGLER POLYMERIZATION MIXTURES
Bernhard Schleimer, Marl, Germany, assignor to Chemische Werke Huls Aktiengesellschaft, a corporation of Germany
No Drawing. Filed Aug. 29, 1966, Ser. No. 575,562
Claims priority, application Germany, Oct. 21, 1965, C 37,218
Int. Cl. C07c 11/12, 7/10, 15/10
U.S. Cl. 260—669       6 Claims

ABSTRACT OF THE DISCLOSURE

Liquid diolefin polymers or copolymers are conventionally washed free of catalyst with methanol or isopropanol because troublesome aqueous emulsions form unless the water washing is done above 50° C. A solution of 33% liquid polybutadiene in benzene made with Ziegler catalyst was cleaned at 80° C. to .005% ash in 10 washings (1:1) with water or 4 washings with dilute aqueous acetic acid.

---

The invention relates to a method of separating low-ash, liquid diolefine polymers or copolymers, prepared by Ziegler-polymerization, from the solution thereof in hydrocarbons or hydrocarbon mixtures, resulting from the polymerization process and containing the inactivated catalyst still dissolved or suspended therein.

There are already known processes which will yield pure polymers with only small catalyst residues. One of these methods first inactivates the catalyst by adding to the polymerization solution a small quantity of alcohol, ketone or amine and then precipitates the liquid polymer by the addition of a large quantity of alcohol, for example methanol or isopropanol. The liquid polymer, having a greater specific weight, is then separated from the hydrocarbon-alcohol mixture, washed repeatedly with methanol for the purpose of removing the catalyst residues, and finally freed of any remaining alcohol and hydrocarbon traces in a vacuum film-evaporator (see published German applications Nos. 1,174,507, Example 1; 1,186,631, Example 1; 1,173,658, Example 1; French Patent No. 1,431,225, Example 1; Houben-Weyle, "Methoden der organischen Chemie," volume XIV/1, page 640, lines 16 to 20).

According to another known method the hydrocarbon, after inactivation of the catalyst, is first separated by distillation or expelled by steam. The remaining liquid polymer which still contains the inactivated catalyst is then freed of the catalyst by repeated washing with methanol to which can also be added inorganic or organic bases or acids. The polymer is then dried, for example in a film evaporator (see published German applications Nos. 1,174,507, column 3, line 55; No. 1,173,658, Example 2; French Patent No. 1,413,225, Examples 7 and 9).

These two methods of processing are costly and uneconomical because great amounts of alcohol are lost so that the substitution of water for alcohol would be obvious. However, if the inactivated aromatic, aliphatic or aromatic-aliphatic (usually benzene, toluene or benzene-hexane) containing polymerization solutions, or the liquid polymers freed of hydrocarbons by distillation or use of steam are washed with water, diluted acids or diluted bases at room temperature instead of with methanol, emulsions are formed which remain stable for periods ranging from several hours to days. Even the use of high-speed centrifuges will not accomplish a clear phase separation.

It was found that it is possible economically to isolate liquid polybutadiene, or liquid copolymers of the butadiene and of other 1,3-diolefines, or liquid copolymers of the butadiene and styrene or its derivatives, of low ash content from the solutions of said polymers and copolymers in hydrocarbons or hydrocarbon mixtures containing the inactivated catalyst still dissolved or suspended therein if the polymerization solutions, after inactivation of the catalyst are mixed with water at temperatures above 50° C., preferably about 75° C., the emulsions resulting therefrom are separated in a settling vat, the organic phase is separated and the liquid polymer and the hydrocarbon are then separated in known manner.

This method accomplishes the separation of the resulting emulsion into two clearly divided phases within a period of only several minutes. Its use is advantageous for example in connection with solutions resulting from polymerizations as described in the published German applications Nos. 1,186,631, 1,174,507, 1,173,658 (Examples 1 and 2), and 1,174,071 (Example 1), the Belgian Patent No. 630,428 and the French Patent No. 1,413,225. At the ends of the polymerizations there are present, depending on the conditions of the various polymerization processes, 1 to 90%, and usually 10 to 60%, solutions of the polymers in benzene, alkylaromatic compounds, mixtures of aromatic and aliphatic compounds, or aliphatic compounds.

In order to carry out the process it is first necessary to inactivate the catalyst in known manner by the admixture of a small quantity of alcohol (for example methanol or isopropyl-alcohol) or a small quantity of ketone (for example acetone) or a small quantity of amine (for example aniline, diethylamine, triethylamine, morpholine) or a small quantity of ether (for example anisole, diethylether, tetrahydrofuran, dioxane). The benzene, alkylaromatic, aliphatic or aromatic-aliphatic hydrocarbon containing polymerization solutions are then mixed with water at temperatures above 50° C., preferably above 75° C.

A high temperature of the washing water is advantageous for two reasons: At rising temperatures (1) the washing effect (ash-removal) will increase, and
(2) the time required for the separation of the emulsion created through the washing into the aqueous phase and the polymer solution will decrease.

It is particularly advantageous to select the water temperature so that the temperature of the emulsion will be at, or 1 to 5° C. below, the boiling point of the hydrocarbon-water-azeotrope. The separation of the emulsion will be very rapid within this temperature range.

In order to attain or approximate this temperature range it is possible, for example in case of toluene or xylene containing polymerization solutions, to introduce superheated steam in measured quantity into the hot water or the emulsion.

Tap water or preferably distilled or desalted water, for example so-called "Wofatit" water, can be used as washing water. In order to wash 10 parts of the polymerization solution, there are required 1 to 100 parts of water, preferably 5 to 50 and normally 10 to 20 parts.

The washing effect of the water is intensified by the admixture of organic or inorganic acids such as acetic acid, propionic acid, hydrochloric acid, hydrobromic acid, or organic bases such as methylamine, aniline, diethylamine, or by the admixture of complexing agents which can form water-soluble complexes with the inactivated catalyst residues. These additives have also an accelerating effect on the separation of the phases. Particularly advantageous is the admixture of acetic acid in such an amount that the washing water contains .001 to 2%, preferably .01 to 1% of acetic acid.

The washing of the inactivated polymerization solution can be carried out either batch-wise or continuously. In the former case the polymerization solutions are stirred in heated stirring vessels together with water heated to temperatures above 50° C., and preferably above 75° C. As a result thereof emulsions are obtained the temperatures of which should be above 40° C. and most advantageously within the range from 0 to 5° C. below the boiling temperature of the hydrocarbon-water-azeotrope. With the stirrer turned off, or after transfer into a settling tank which can be heated, the emulsions separate within a few minutes into the heavier washing water and the lighter polymer solution. The aqueous phase of greater specific weight is separated. This washing operation can be repeated several times until the desired ash content values are attained.

In case of continuous washing the inactivated polymerization solution and the hot washing water are emulsified in a flow-through mixer. The heated emulsion will separate quickly within a settling tank, placed in series, into the organic and the aqueous phases. The latter is disposed of or recycled to make the process more economical. In order to insure a continuous operation it is expedient to place several settling tanks parallel to each other.

The washed polymer solution is then separated in a vacuum film-evaporator into the liquid polymer and the hydrocarbon. Thus the azeotropic water, introduced by the washing into the organic phase is distilled and removed at this time. It is also feasible to separate the washed polymer solution into the hydrocarbon and the polymer by steam distillation. If this method is used, the polymer must subsequently be freed of the adhering or absorbed water.

The method of the invention is simple and economical and yields water-clear polymers of low ash content. Ash values of < .1%, desired in many cases, are normally attained after one washing of an approximately 30% polymerization solution (the diluent containing 30% of liquid polymer) with heated .02% acetic acid in a weight ratio of 1:1. If the polymerization solution is washed several times, or if during the emulsifying process the ratio of washing water to polymer solution is increased up to a ratio of 10:1, or if a stronger acetic acid is used, ash values as low as .001% are attained.

Example 1

In a benzene containing polymerization solution which contains 32.5% liquid, low-molecular polybutadiene and which was prepared by polymerization of butadiene with a Ziegler mixed catalyst of ethylaluminumsesquichloride/nickel-(II)-acetyl-acetonate, the catalyst is inactivated by a small quantity of methanol. 1 liter each of this inactivated polymerization solution was further processed by the following methods:

(a) The benzene was separated in a vacuum film-evaporator. The remaining liquid polybutadiene contained the maximum catalyst residue (see Table 1).

(b) By use of 2 liters of methanol the liquid polybutadiene was precipitated from the benzene containing solution and the polymer was washed three times and stirred for one hour, each time with 1 liter of methanol. The washing methanol was separated each time and the polybutadiene was then freed of any remaining methanol and traces of benzene under a vacuum created by a water jet aspirator at 50° C. The liquid polybutadiene had a desirably very low ash content (see Table 1).

(c) The polybutadiene solution was mixed with stirring with 1 liter of water at room temperature (20° C.), resulting in an emulsion. After 24 hours there was still no noticeable phase separation.

(d) The polybutadiene solution was washed four times, each time for 1 hour with 1 liter of water at 80° C. The emulsion so generated separated within a few minutes into two phases. After the final washing the organic phase was placed into a film-evaporator and the polymer was freed of benzene and water. The ash content is shown in Table 1.

(e) As shown under (d) but the washing was repeated six times, each time by use of 1 liter of water at 80° C.

(f) As shown under (d) but the washing was repeated eight times, each time by use of 1-liter of water at 80° C.

(g) As shown under (d) but the washing was repeated ten times, each time by use of 1 liter of water at 80° C.

(h) As shown under (d) but the washing was repeated four times, each time by use of 1 liter of .5% acetic acid at 80° C.

(k) As shown under (d) but the washing was repeated ten times, each time by use of 1 liter of .5% acetic acid at 80° C.

TABLE 1

| Method | Viscosity, cp./50 | Iodine number | Refractive index $n_D^{20}$ | Total ash, percent by wt. | Aluminum content percent by wt. | Nickel content, percent by weight |
| --- | --- | --- | --- | --- | --- | --- |
| a | 235 | 457 | 1.5233 | .071 | .027 | .0054 |
| b | 238 | 460 | 1.5237 | .005 | .0015 | .0003 |
| c | -- | -- | ------ | ---- | ----- | ----- |
| d | 230 | 468 | 1.5239 | .025 | .0040 | .0002 |
| e | 234 | 452 | 1.5240 | .015 | .0013 | .0001 |
| f | 225 | 464 | 1.5239 | .010 | .0006 | .0001 |
| g | 232 | 459 | 1.5233 | .006 | .0005 | .0001 |
| h | 238 | 458 | 1.5234 | .005 | .002 | .0001 |
| k | 236 | 457 | 1.5235 | .005 | .001 | .0001 |

Example 2

The catalyst was prepared in a 150-liter polymerization vessel which was rinsed with nitrogen to exclude atmospheric oxygen and moisture and was charged with 60.0 kg. (68.3 l.) of benzene, containing 25 p.p.m. of water, by adding, at room temperature, 32.1 g. (.125 mol) of nickel-(II)-acetylacetonate and 371.3 g. (3.0 mol) of ethylaluminumsesquichloride in the presence of 3.0 kg. of butadiene. Then there was added, at a polymerization temperature of 25° C., gradually and continuously at the rate of 4.5 kg. of butadiene per hour over a period of six hours and with stirring a total of 27.0 kg. of butadiene which at a purity of 99.4% contained .04 mol percent of butadiene-(1,2), .01 mol percent of propadiene, .01 mol percent of ethylacetylene, .32 mol percent of isobutene, .17 mol percent of n-butane and .01 mol percent of propylene. The polymerization was then continued for another 30 minutes.

Upon conclusion of the polymerization the catalyst was inactivated by the addition of 1,000 ml. of methanol. Thereupon the benzene containing polymerization solution which contained 32.6% of liquid polybutadiene was emulsified in a flow-through washer with .02% acetic acid (weight ratio of the .02% acetic acid to the polymerization solution=1:1) which was heated to 95° C. The hot emulsion was then heated in a flow-through heater to approximately 70° C. (boiling temperature of the benzene-water-azeotrope=69.3° C. according to M. Lecat "Table azeotropiques," second edition, Brussels 1949). In a settling tank the hot emulsion separated quickly into the aqueous phase and the polymer-containing benzene phase. A specimen of the benzene phase was separated by distillation in benzene and liquid polybutadiene. The polymer had an ash content of .064%. A second washing of the benzene polymer solution, carried out under the same conditions, reduced the ash content to .015%. After a third washing the polymer solution was separated in a film-evaporator into benzene (through the column head) and liquid polybutadiene (sump). The yield was 24.8 kg. (82.6 % of the calculated value) of a liquid, water-clear polybutadiene with a viscosity of 3,620 centipoise at 20° C. (as determined by the Hoeppler dropping ball viscometer in accordance with Haake) and a molecular weight of 3,350 (measured by the vapor-pressure osmometer). The ash content was .008%.

I claim:

1. Process which comprises mixing a solution of a liquid polymer selected from the group consisting of polybutadiene, copolymers of butadiene with other 1,3-diolefines and copolymers of butadiene with styrene and its derivatives all polymers or copolymers prepared by Ziegler polymerization, in an organic solvent selected from the group consisting of hydrocarbons and mixtures of hydrocarbons, said solution containing the residue of the inactivated polymerization catalyst, with water in the ratio of 1 to 100 parts of water per 10 parts of said solution of the liquid polymer, said water having a temperature above 50° C. but not higher than that at which the temperature of the resulting mixture will be below the boiling temperature of the resulting water-hydrocarbon azeotrope, thereby forming an emulsion of said water and said solution, separating said emulsion into an aqueous phase and an organic phase, and treating said organic phase for the separation of said liquid polymer and said organic solvent.

2. Process as defined in claim 1 in which the temperature of said water that is mixed with said solution is such that the temperature of the resulting emulsion is from 1 to 5° C. below the boiling temperature of said azeotrope.

3. Process as defined in claim 1 in which the temperature of said water that is mixed with said solution is between 50 and 100° C.

4. Process as defined in claim 1 in which the temperature of said water that is mixed with said solution is between 75 and 100° C.

5. Process as defined in claim 1 in which said water contains dissolved therein an agent selected from the group consisting of organic and inorganic acids, organic bases, and complexing agents capable of forming water soluble complexes with said catalyst residue.

6. Process as defined in claim 5 in which said agent is .001 to .2% of acetic acid.

References Cited

UNITED STATES PATENTS

| | | | |
|---|---|---|---|
| 3,156,736 | 11/1964 | Southern et al. | 260—681.5 |
| 3,168,586 | 2/1965 | Cull et al. | 260—680 |
| 3,312,752 | 4/1967 | Schleimer | 260—680 |
| 3,325,558 | 6/1967 | George et al. | 260—680 |
| 3,341,617 | 9/1967 | Schleimer et al. | 260—680 |

DELBERT E. GANTZ, *Primary Examiner.*

G. E. SCHMITKONS, *Assistant Examiner.*

U.S. Cl. X.R.

260—680, 681.5